United States Patent
Yang et al.

(10) Patent No.: US 12,555,777 B2
(45) Date of Patent: Feb. 17, 2026

(54) LAYERED STRUCTURE OF BATTERY ELECTRODES

(71) Applicant: Apple Inc., Cupertino, CA (US)

(72) Inventors: Xiaoyun Yang, San Jose, CA (US); Aaron Smith, Santa Clara, CA (US); Wanjie Zhang, Beijing (CN); Siva Ram Kumar Muthukumar, San Jose, CA (US); Kai Yu, Suzhou (CN); Enbang Wang, San Lorenzo, CA (US); Yafeng Chen, Shanghai (CN); Rohit Bedida, Cupertino, CA (US); Xiaoyu Shen, Huzhou (CN); Xingxing Zhang, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 678 days.

(21) Appl. No.: 17/941,253

(22) Filed: Sep. 9, 2022

(65) Prior Publication Data
US 2024/0088354 A1    Mar. 14, 2024

(51) Int. Cl.
*H01M 4/36* (2006.01)
*H01M 4/60* (2006.01)
*H01M 4/66* (2006.01)

(52) U.S. Cl.
CPC ........... *H01M 4/366* (2013.01); *H01M 4/602* (2013.01); *H01M 4/661* (2013.01); *H01M 4/663* (2013.01)

(58) Field of Classification Search
CPC ...... H01M 4/366; H01M 4/602; H01M 4/661; H01M 4/663
See application file for complete search history.

(56) References Cited

U.S. PATENT DOCUMENTS

| | | | |
|---|---|---|---|
| 8,785,041 B2 | 7/2014 | Inoue et al. | |
| 9,520,580 B2 | 12/2016 | Sayre et al. | |
| 9,577,259 B2 | 2/2017 | Flitsch et al. | |
| 10,862,129 B2 | 12/2020 | Pan et al. | |
| 2010/0112454 A1* | 5/2010 | Visco | H01M 4/366 |
| | | | 429/246 |
| 2014/0045008 A1 | 2/2014 | Yan et al. | |
| 2020/0343533 A1* | 10/2020 | Herle | H01M 4/134 |
| 2022/0209242 A1* | 6/2022 | Horikawa | H01M 10/4235 |

FOREIGN PATENT DOCUMENTS

| | | | | |
|---|---|---|---|---|
| CN | 113270589 A | * | 8/2021 | ........ H01M 10/0525 |
| JP | 2010278455 | | 12/2010 | |
| KR | 101132169 | | 4/2012 | |
| KR | 101237351 | | 3/2013 | |
| WO | WO-2022242255 A1 | * | 11/2022 | .............. H01M 4/66 |

OTHER PUBLICATIONS

English Machine Translation for CN-113270589-A (Year: 2021).*
English Machine Translation for WO-2022242255-A1 (Year: 2022).*

* cited by examiner

*Primary Examiner* — Matthew T Martin
*Assistant Examiner* — Katherine N Higgins
(74) *Attorney, Agent, or Firm* — FLETCHER YODER PC (57) ABSTRACT

A battery electrode includes a first metal foil, a second metal foil, and a thermoplastic polymer layer between the first metal foil and the second metal foil. The battery electrode also includes a first coating adjacent to the first metal foil such that the first metal foil is between the thermoplastic polymer layer and the first coating. The battery electrode also includes a second coating adjacent to the second metal foil such that the second metal foil is between the thermoplastic polymer layer and the second coating.

19 Claims, 9 Drawing Sheets

LAYERED STRUCTURE OF BATTERY ELECTRODES

BACKGROUND

The present disclosure relates generally to battery electrodes. More specifically, the present disclosure relates to a layered structure of a battery electrode.

A battery, such as a secondary (e.g., rechargeable) battery, may be formed by one or more housing structures (e.g., a pouch, a can, a casing) that receive electrodes, one or more separators, electrolyte, and other possible componentry. In general, the battery may be employed as a source of power for a load, such as an electronic device. For example, terminals of the battery may be coupled to the electrodes disposed in the housing structure of the battery. The terminals may protrude from the housing structure to facilitate a coupling of the terminals with the load.

In traditional batteries, the electrodes (e.g., anodes and cathodes) may include, for example, a substrate material and an active material adjacent the substrate material. The substrate material may be disposed between a first layer of the active material and a second layer of the active material. While this arrangement may enable the traditional battery to power the load, it may be susceptible to short circuits caused by mechanical abuse of the battery. Short circuits may significantly increase the temperature of the battery in a short period of time, potentially resulting in a thermal event. Accordingly, it is now recognized that improved battery electrodes are desired.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In an embodiment, a battery electrode includes a first metal foil, a second metal foil, and a thermoplastic polymer layer between the first metal foil and the second metal foil. The battery electrode also includes a first coating adjacent to the first metal foil such that the first metal foil is between the thermoplastic polymer layer and the first coating. The battery electrode also includes a second coating adjacent to the second metal foil such that the second metal foil is between the thermoplastic polymer layer and the second coating.

In another embodiment, a layered structure for a battery electrode includes a first metal foil, a second metal foil, and a thermoplastic polymer layer between the first metal foil and the second metal foil, wherein the thermoplastic polymer layer includes polyethylene terephthalate, cast polypropylene, or both.

In yet another embodiment, a secondary battery includes an anode having a first thermoplastic polymer layer between a first copper foil and a second copper foil, a first graphite coating adjacent to the first copper foil such that the first copper foil is between the first graphite coating and the first thermoplastic polymer layer, and a second graphite coating adjacent to the second copper foil such that the second copper foil is between the second graphite coating and the first thermoplastic polymer layer. The secondary battery also includes a cathode having a second thermoplastic polymer layer between a first aluminum foil and a second aluminum foil, a first lithium cobalt oxide coating adjacent to the first aluminum foil such that the first aluminum foil is between the first lithium cobalt oxide coating and the second thermoplastic polymer layer, and a second lithium cobalt oxide coating adjacent to the second aluminum foil such that the second aluminum foil is between the second lithium cobalt oxide coating and the second thermoplastic polymer layer.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings described below in which like numerals refer to like parts.

DETAILED DESCRIPTION OF SPECIFIC EMBODIMENTS

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. Furthermore, the particular features, structures, or characteristics may be combined in any suitable manner in one or more embodiments. Use of the terms "approximately," "near," "about," "close to," and/or "substantially" should be understood to mean including close to a target (e.g., design, value, amount), such as within a margin of any suitable or contemplatable error (e.g., within 0.1% of a target, within 1% of a target, within 5% of a target, within 10% of a target, within 25% of a target, and so on). Moreover, it should be understood that any exact values, numbers, measurements, and so on, provided herein, are contemplated to include approximations (e.g., within a margin of suitable or contemplatable error) of the exact values, numbers, measurements, and so on).

The present disclosure relates generally to electrodes of a battery, such as a secondary (e.g., rechargeable) battery. More specifically, the present disclosure relates to a layered structure of a battery electrode. Among other benefits, the layered structure is configured to reduce, relative to traditional embodiments, a likelihood of short circuits caused by mechanical abuse of the battery.

In accordance with the present disclosure, a battery includes a housing structure (e.g., a pouch, a can, a casing) configured to receive electrodes, one or more separators, an electrolyte, and other possible componentry of the battery. Terminals of the battery may be coupled with the electrodes and protrude from the housing structure, such that the terminals are exposed for coupling to a load (e.g., an electronic device). In general, each electrode includes a layered structure having first and second coatings including an active material, first and second metal foils disposed between the first and second coatings, and one or more thermoplastic polymer layers disposed between the first and second metal foils.

For example, the battery may include a lithium-ion battery. An anode of the battery may include first and second coatings including graphite, first and second metal foils including copper, and one or more thermoplastic polymer layers including polyethylene terephthalate (PET), cast polypropylene (CPP), or both. Further, a cathode of the battery may include first and second coatings including lithium cobalt oxide (LCO), first and second metal foils including aluminum, and one or more thermoplastic polymer layers including polyethylene terephthalate (PET), cast polypropylene (CPP), or both. In both the anode and the cathode, the one or more thermoplastic polymer layers may include, for example, a first layer including the CPP, a second layer including the CPP, and a third layer including the PET, where the third layer is disposed between the first layer and the second layer. Alternatively, the one or more thermoplastic polymer layers may include three layers having the PET. Other arrangements of the one or more thermoplastic polymer layers are also contemplated by the present disclosure. For brevity, the one or more thermoplastic polymer layers may be described, in certain instances of the present disclosure, as a thermoplastic polymer layer (e.g., including multiple thermoplastic polymer sublayers).

The thermoplastic polymer layer may include a matrix of openings or voids therethrough. The first and second metal foils may be sputtered or otherwise disposed on opposing sides of the thermoplastic polymer layer such that the openings or voids in the thermoplastic polymer layer facilitate electrical conductive paths between the first and second metal foils. Accordingly, the thermoplastic polymer layer may not block the first and second metal foils from acting as current collectors of the electrode. Further, in general, the thermoplastic polymer layer may be configured to reduce a likelihood of a short circuit caused by mechanical abuse of the battery. For example, the thermoplastic polymer layer may be configured to reduce burring (e.g., in the first and second metal foils of each electrode) that may otherwise be caused by mechanical abuse of the battery. These and other features will be described in detail below with reference to the drawings.

Figure 1:
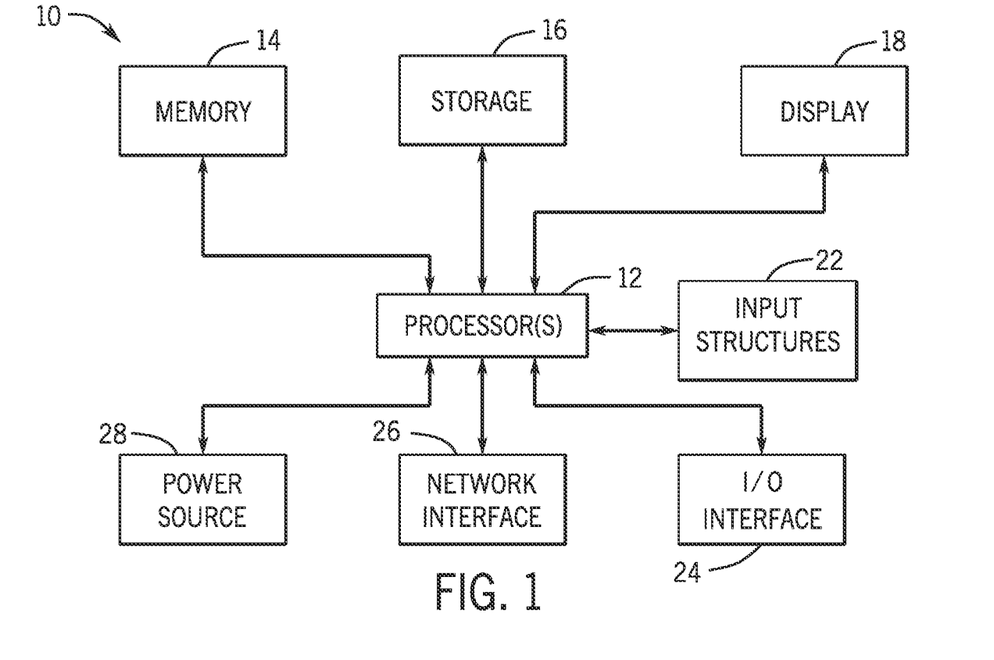
FIG. 1 is a block diagram of an electronic device, in accordance with an embodiment of the present disclosure.

With the foregoing in mind, a general description of suitable electronic devices that may employ the presently disclosed battery electrodes will be provided below. Turning first to FIG. 1, an electronic device 10 according to an embodiment of the present disclosure may include, among other things, one or more processor(s) 12, memory 14, nonvolatile storage 16, a display 18, input structures 22, an input/output (I/O) interface 24, a network interface 26, and a power source 28. The various functional blocks shown in FIG. 1 may include hardware elements (including circuitry), software elements (including computer code stored on a computer-readable medium) or a combination of both hardware and software elements. It should be noted that FIG. 1 is merely one example of a particular implementation and is intended to illustrate the types of components that may be present in electronic device 10.

Figure 2:
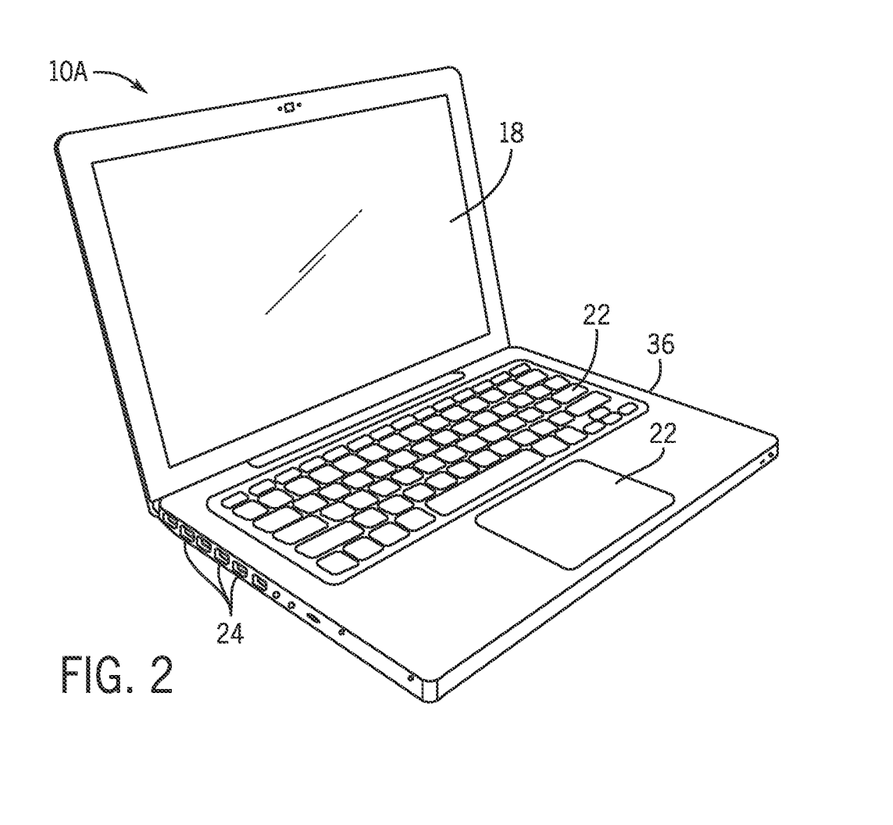
FIG. 2 is a perspective view of the electronic device of FIG. 1 in the form of a notebook computer, in accordance with an embodiment of the present disclosure.
Figure 3:
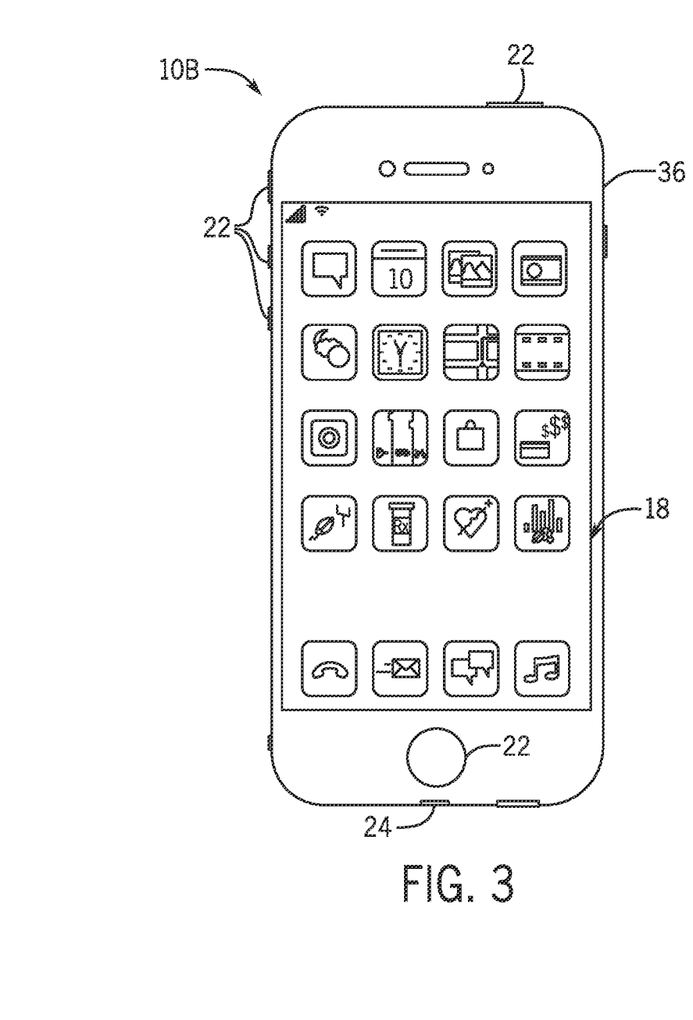
FIG. 3 is a front view of the electronic device of FIG. 1 in the form of a handheld device, in accordance with an embodiment of the present disclosure.
Figure 4:
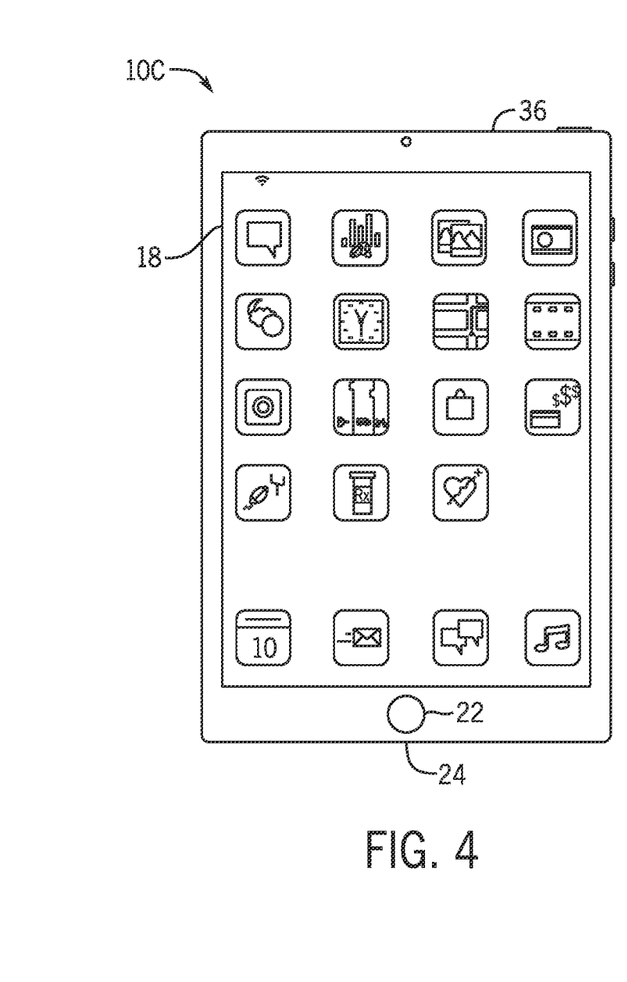
FIG. 4 is a front view of the electronic device of FIG. 1 in the form of portable tablet computer, in accordance with an embodiment of the present disclosure.
Figure 5:
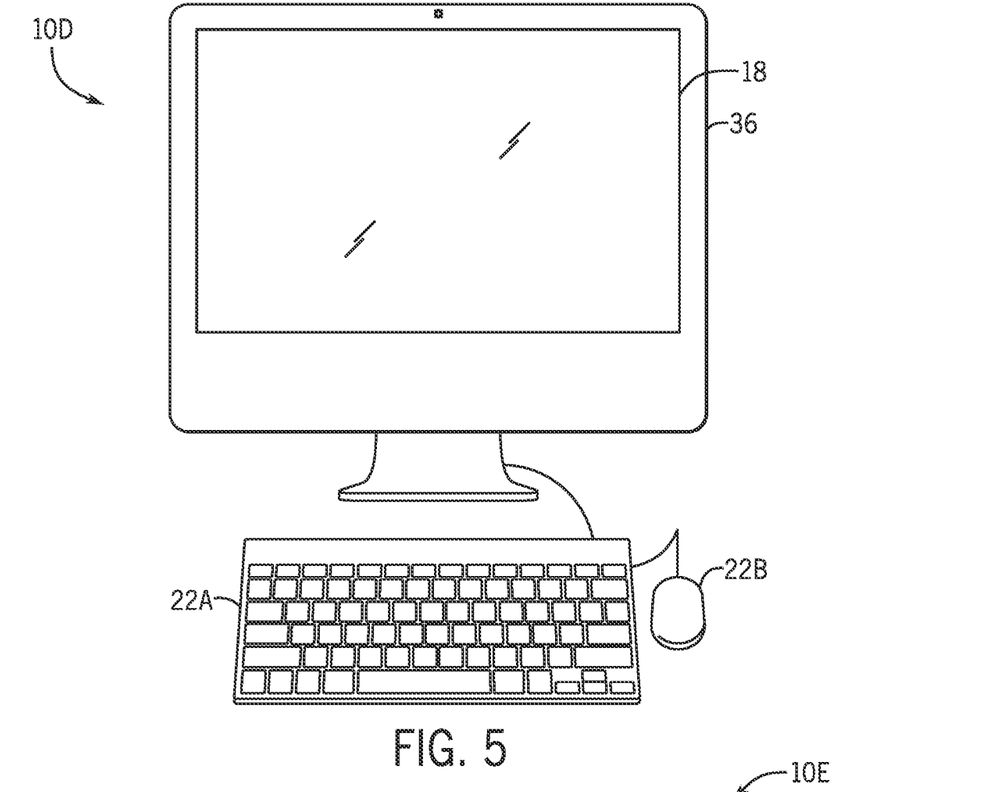
FIG. 5 is a front view of the electronic device of FIG. 1 in the form of a desktop computer, in accordance with an embodiment of the present disclosure.
Figure 6:
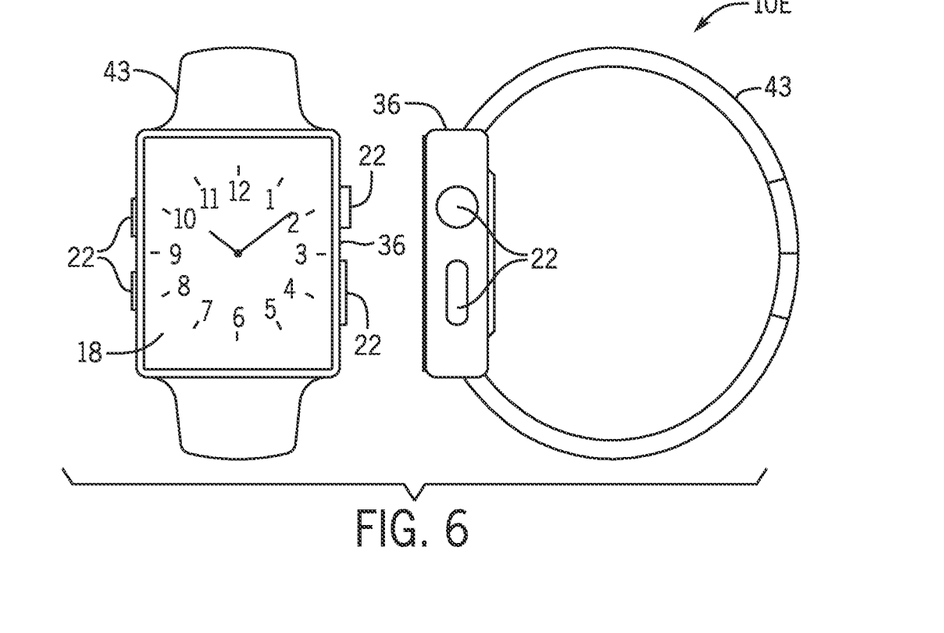
FIG. 6 is a front and side view of the electronic device of FIG. 1 in the form of a wearable electronic device, in accordance with an embodiment of the present disclosure.

By way of example, the electronic device 10 may represent a block diagram of the notebook computer depicted in FIG. 2, the handheld device depicted in FIG. 3, the handheld device depicted in FIG. 4, the desktop computer depicted in FIG. 5, the wearable electronic device depicted in FIG. 6, or similar devices. It should be noted that the processor(s) 12 and other related items in FIG. 1 may be generally referred to herein as "data processing circuitry." Such data processing circuitry may be embodied wholly or in part as software, firmware, hardware, or any combination thereof. Furthermore, the data processing circuitry may be a single contained processing module or may be incorporated wholly or partially within any of the other elements within the electronic device 10.

In the electronic device 10 of FIG. 1, the processor(s) 12 may be operably coupled with the memory 14 and the nonvolatile storage 16 to perform various algorithms. Such programs or instructions executed by the processor(s) 12 may be stored in any suitable article of manufacture that includes one or more tangible, computer-readable media at least collectively storing the instructions or routines, such as the memory 14 and the nonvolatile storage 16. The memory 14 and the nonvolatile storage 16 may include any suitable articles of manufacture for storing data and executable instructions, such as random-access memory, read-only memory, rewritable flash memory, hard drives, and optical discs. In addition, programs (e.g., an operating system) encoded on such a computer program product may also include instructions that may be executed by the processor(s) 12 to enable the electronic device 10 to provide various functionalities.

In certain embodiments, the display 18 may be a liquid crystal display (LCD), which may allow users to view images generated on the electronic device 10. In some embodiments, the display 18 may include a touch screen, which may allow users to interact with a user interface of the electronic device 10. Furthermore, it should be appreciated that, in some embodiments, the display 18 may include one or more organic light emitting diode (OLED) displays, or some combination of LCD panels and OLED panels.

The input structures 22 of the electronic device 10 may enable a user to interact with the electronic device 10 (e.g., pressing a button to increase or decrease a volume level). The I/O interface 24 may enable electronic device 10 to interface with various other electronic devices, as may the network interface 26. The network interface 26 may include, for example, one or more interfaces for a personal area network (PAN), such as a Bluetooth network, for a local area network (LAN) or wireless local area network (WLAN), such as an 802.11x Wi-Fi network, and/or for a wide area network (WAN), such as a 3rd generation (3G) cellular network, 4th generation (4G) cellular network, Long-Term Evolution (LTE) cellular network, Long-Term Evolution license assisted access (LTE-LAA) cellular network, 5th generation (5G) cellular network, or New Radio (NR) cellular network. The network interface 26 may also include one or more interfaces for, for example, broadband fixed wireless access networks (WiMAX), mobile broadband Wireless networks (mobile WiMAX), asynchronous digital subscriber lines (e.g., ADSL, VDSL), digital video broadcasting-terrestrial (DVB-T) and its extension DVB Handheld (DVB-H), ultra-wideband (UWB), alternating current (AC) power lines, and so forth. Network interfaces 26 such as the one described above may benefit from the use of tuning circuitry, impedance matching circuitry and/or noise filtering circuits that may include polymer capacitors such as the ones described herein. As further illustrated, the electronic device 10 may include a power source 28. The power source 28 may include any suitable source of power, such as a rechargeable lithium polymer (Li-poly) battery and/or an alternating current (AC) power converter.

In certain embodiments, the electronic device 10 may take the form of a computer, a portable electronic device, a wearable electronic device, or other type of electronic device. Such computers may include computers that are generally portable (such as laptop, notebook, and tablet computers) as well as computers that are generally used in one place (such as conventional desktop computers, workstations, and/or servers). In certain embodiments, the electronic device 10 in the form of a computer may be a model of a MacBook®, MacBook® Pro, MacBook Air®, iMac®, Mac® mini, or Mac Pro® available from Apple Inc. By way of example, the electronic device 10, taking the form of a notebook computer 10A, is illustrated in FIG. 2 in accordance with one embodiment of the present disclosure. The depicted computer 10A may include a housing or enclosure 36, a display 18, input structures 22, and ports of an I/O interface 24. In one embodiment, the input structures 22 (such as a keyboard and/or touchpad) may be used to interact with the computer 10A, such as to start, control, or operate a GUI or applications running on computer 10A. For example, a keyboard and/or touchpad may allow a user to navigate a user interface or application interface displayed on display 18.

FIG. 3 depicts a front view of a handheld device 10B, which represents one embodiment of the electronic device 10. The handheld device 10B may represent, for example, a portable phone, a media player, a personal data organizer, a handheld game platform, or any combination of such devices. By way of example, the handheld device 10B may be a model of an iPod® or iPhone® available from Apple Inc. of Cupertino, California. The handheld device 10B may include an enclosure 36 to protect interior components from physical damage and to shield them from electromagnetic interference. The enclosure 36 may surround the display 18. The I/O interfaces 24 may open through the enclosure 36 and may include, for example, an I/O port for a hard-wired connection for charging and/or content manipulation using a standard connector and protocol, such as the Lightning connector provided by Apple Inc., a universal serial bus (USB), or other similar connector and protocol.

User input structures 22, in combination with the display 18, may allow a user to control the handheld device 10B. For example, the input structures 22 may activate or deactivate the handheld device 10B, navigate user interface to a home screen, a user-configurable application screen, and/or activate a voice-recognition feature of the handheld device 10B. Other input structures 22 may provide volume control, or may toggle between vibrate and ring modes. The input structures 22 may also include a microphone may obtain a user's voice for various voice-related features, and a speaker may enable audio playback and/or certain phone capabilities. The input structures 22 may also include a headphone input may provide a connection to external speakers and/or headphones.

FIG. 4 depicts a front view of another handheld device 10C, which represents another embodiment of the electronic device 10. The handheld device 10C may represent, for example, a tablet computer, or one of various portable computing devices. By way of example, the handheld device 10C may be a tablet-sized embodiment of the electronic device 10, which may be, for example, a model of an iPad® available from Apple Inc. of Cupertino, California.

Turning to FIG. 5, a computer 10D may represent another embodiment of the electronic device 10 of FIG. 1. The computer 10D may be any computer, such as a desktop computer, a server, or a notebook computer, but may also be a standalone media player or video gaming machine. By way of example, the computer 10D may be an iMac®, a MacBook®, or other similar device by Apple Inc. It should be noted that the computer 10D may also represent a personal computer (PC) by another manufacturer. A similar enclosure 36 may be provided to protect and enclose internal components of the computer 10D such as the display 18. In certain embodiments, a user of the computer 10D may interact with the computer 10D using various peripheral input devices, such as the keyboard 22A or mouse 22B (e.g., input structures 22), which may connect to the computer 10D.

Similarly, FIG. 6 depicts a wearable electronic device 10E representing another embodiment of the electronic device 10 of FIG. 1 that may be configured to operate using the techniques described herein. By way of example, the wearable electronic device 10E, which may include a wristband 43, may be an Apple Watch® by Apple, Inc. However, in other embodiments, the wearable electronic device 10E may include any wearable electronic device such as, for example, a wearable exercise monitoring device (e.g., pedometer, accelerometer, heart rate monitor), or other device by another manufacturer. The display 18 of the wearable electronic device 10E may include a touch screen display 18 (e.g., LCD, OLED display, active-matrix organic light emitting diode (AMOLED) display, and so forth), as well as input structures 22, which may allow users to interact with a user interface of the wearable electronic device 10E.

In any of the electronic devices 10 illustrated in FIGS. 1-6, a battery in accordance with the present disclosure may be employed to power the electronic device 10, including as at least part of the power source 28 shown in FIG. 1. The battery may include various electrodes, where each electrode includes a layered structure. The layered structure may include first and second coatings including an active material, first and second metal foils disposed between the first and second coatings, and a thermoplastic polymer layer disposed between the first and second metal foils. The thermoplastic polymer layer may include, for example, polyethylene terephthalate (PET), cast polypropylene (CPP), or both. As an example, the thermoplastic polymer layer may include a first sublayer having the CPP, a second sublayer having the CPP, and a third sublayer having the PET and disposed between the first and second sublayers. Alternatively, the thermoplastic polymer layer may include three sublayers having the PET. Additionally or alternatively, PET and CPP may be blended in the thermoplastic polymer layer and/or any sublayers thereof. In any case, the thermoplastic polymer layer may include openings or voids therethrough that facilitate electrical conductive paths between the first and second metal foils, which enables normal operation of the battery. In general, the thermoplastic polymer layer is configured to reduce a likelihood of burring in the first and second metal foils and corresponding short circuits caused by mechanical abuse of the battery. These and other features are described in detail below with reference to FIGS. 7-12.

Figure 7:
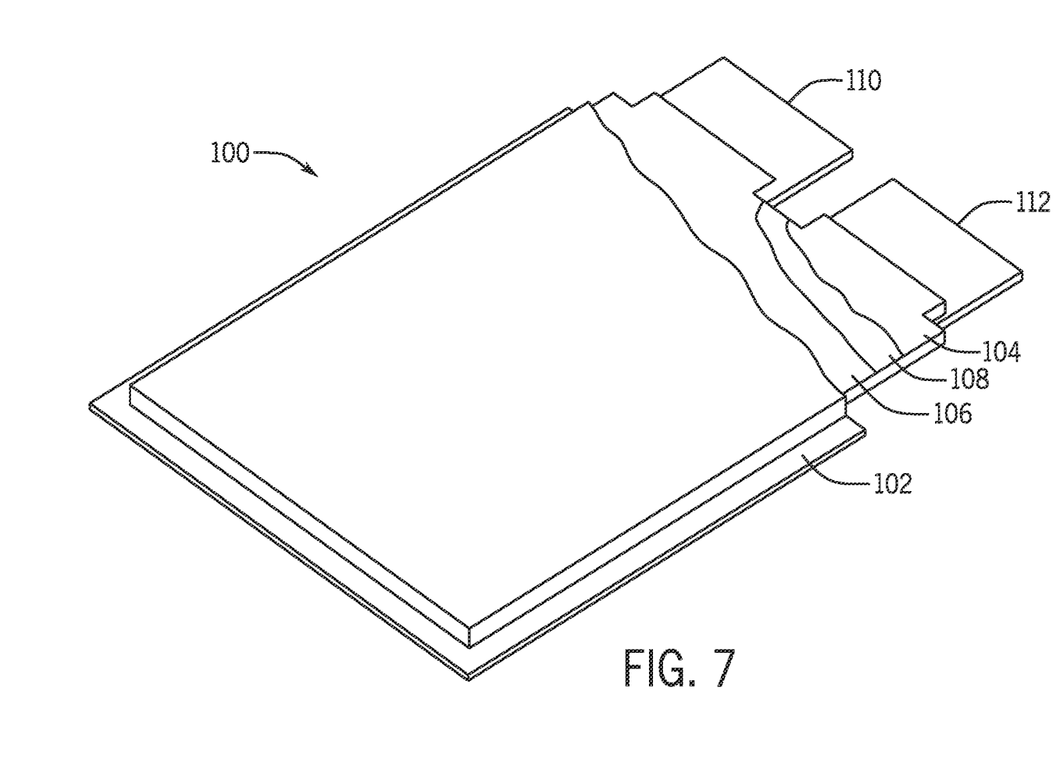
FIG. 7 is a perspective view of a battery employed in any of the devices in FIGS. 1-6, in accordance with an embodiment of the present disclosure.

FIG. 7 is a perspective view of an embodiment of a battery 100 employed in any of the devices 10 in FIGS. 1-6. The battery 100 may be, for example, a secondary (e.g., rechargeable) battery, such as a lithium-ion battery. In the illustrated embodiment, the battery 100 includes a housing structure 102 (e.g., a pouch, a can, a casing) configured to receive a first electrode 104 (e.g., an anode), a second electrode 106 (e.g., a cathode), a separator 108 disposed between (and separating) the first electrode 104 and the second electrode 106, and an electrolyte. Other componentry disposed in the housing structure 102 are also possible. A first terminal tab 110 and a second terminal tab 112, configured to be coupled to a load (e.g., the electronic device 10 or any suitable components of the electronic device 10 in any of FIGS. 1-6), may protrude from the housing structure 102. While only one instance of each of the first electrode 104, the second electrode 106, and the separator 108 is shown in the illustrated embodiment, any number of instances of the first electrode 104, the second electrode 106, and the separator 108 may be employed. For example, the battery 100 may include a stacked arrangement with an alternating order of the first electrode 104 and the second electrode 106, with one or more instances of the separator 108 disposed between each instance of the first electrode 104 and the second electrode 106.

In accordance with the present disclosure, each of the first electrode 104 and the second electrode 106 may include a layered structure having first and second coatings including an active material, first and second metal foils disposed between the first and second coatings, and a thermoplastic polymer layer disposed between the first and second metal foils. For example, in the first electrode 104 (e.g., the anode), the first and second coatings may include graphite, and the first and second metal foils may include copper. In the second electrode 106 (e.g., the cathode), the first and second coatings may include lithium cobalt oxide (LCO), and the first and second metal foils may include aluminum. The thermoplastic polymer layer in each of the first electrode 104 and the second electrode 106 may include, for example, polyethylene terephthalate (PET), cast polypropylene (CPP), or both. As an example, the thermoplastic polymer layer may include a first sublayer having the CPP, a second sublayer having the CPP, and a third sublayer having the PET and disposed between the first and second sublayers. Alternatively, the thermoplastic polymer layer may include three sublayers having the PET. Additionally or alternatively, PET and CPP may be blended in the thermoplastic polymer layer and/or any sublayers thereof. As previously described, the thermoplastic polymer layer is configured to enable normal operation of the battery 100 while reducing a likelihood of burring in the first and second metal foils (and corresponding short circuits) caused by mechanical abuse of the battery 100.

Figure 8:
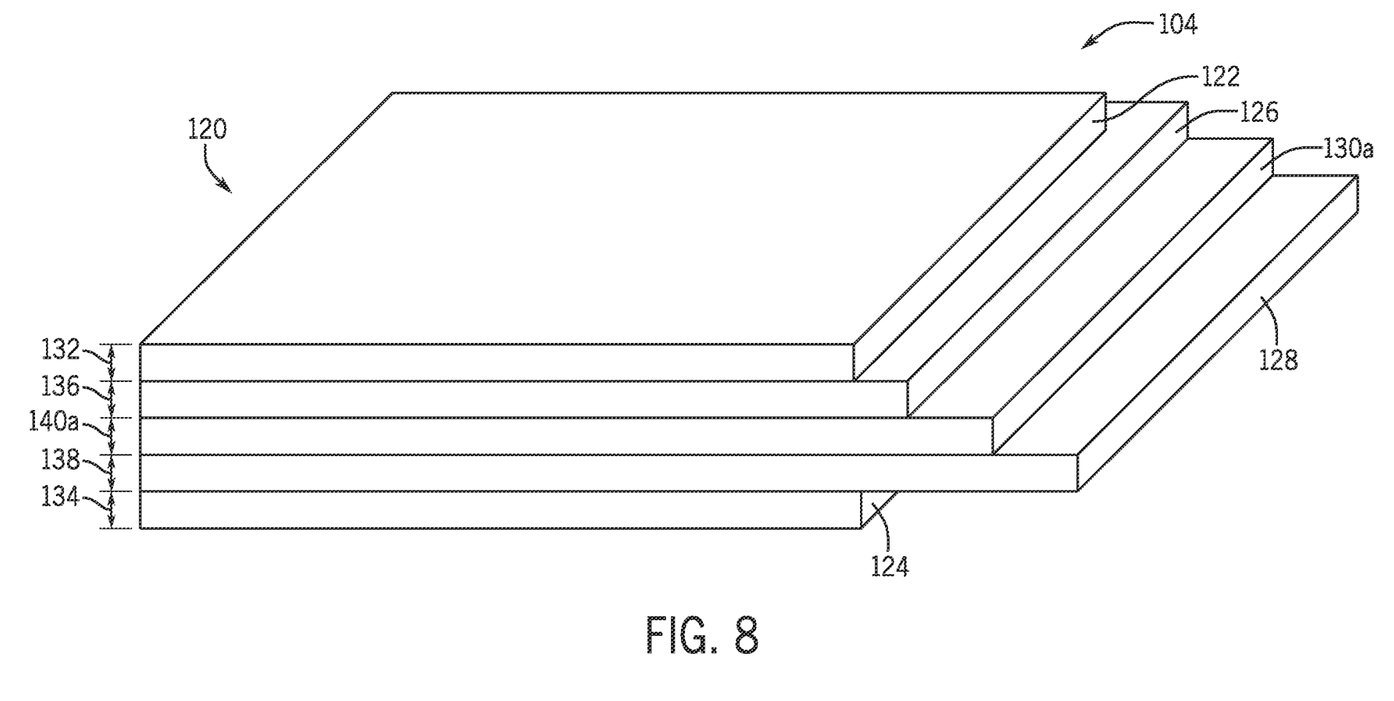
FIG. 8 is a schematic perspective view of a portion of an anode of the battery of FIG. 7, the anode including a thermoplastic polymer layer, in accordance with an embodiment of the present disclosure.

For example, FIG. 8 is a schematic perspective view of an embodiment of a portion of the first electrode 104 of the battery 100 of FIG. 7. For purposes of clarity, the first electrode 104 will be referred to as the anode 104 below. In the illustrated embodiment, the anode 104 includes a layered structure 120 having a first coating 122 including graphite, a second coating 124 including graphite, a first metal foil 126 including copper, a second metal foil 128 including copper, and a thermoplastic polymer layer 130a including PET, CPP, or both. The first metal foil 126, the second metal foil 128, and the thermoplastic polymer layer 130a, which may be collectively referred to as a laminated film, may be disposed between the first coating 122 and the second coating 124. Further, the thermoplastic polymer layer 130a may be disposed between the first metal foil 126 and the second metal foil 128. Use of the thermoplastic polymer layer 130a (e.g., including PET, CCP, or both) in the laminated film as described above may enable a proper tensile strength and elongation rate similar to those in traditional films (e.g., metal foils) that do not employ the thermoplastic polymer layer 130a.

The thermoplastic polymer layer 130a may be configured to reduce burring in the first metal foil 126 and the second metal foil 128 that may otherwise occur in response to mechanical abuse of the anode 104. Further, the thermoplastic polymer layer 130a may include openings or voids therethrough that facilitate electrical conductive paths between the first metal foil 126 and the second metal foil 128. For example, in some embodiments, the first metal foil 126 and the second metal foil 128 may be sputtered or otherwise disposed on opposing sides of the thermoplastic polymer layer 130a such that the corresponding material (e.g., copper) fills the openings or voids in the thermoplastic polymer layer 130a between the first metal foil 126 and the second metal foil 128.

Sizing of the first and second coatings 122, 124, the first and second metal foils 126, 128, and the thermoplastic polymer layer 130a may be selected to enable normal operation of the anode 104 and corresponding battery (e.g., periodic, cyclical, or repetitive charging and discharging of the battery without malfunction and/or overheating) and improve burring and short circuit protection thereof. In the illustrated embodiment, the first coating 122 includes a first thickness 132, the second coating 124 includes a second thickness 134, the first metal foil 126 includes a third thickness 136, the second metal foil 128 includes a fourth thickness 138, and the thermoplastic polymer layer 130a includes a fifth thickness 140a. In one embodiment, the third thickness 136 may be within a range of 1 nanometer to 3 micrometers, the fourth thickness 138 may be within a range of 1 nanometer to 3 micrometers, and the fifth thickness 140a may be within a range of 2 micrometers to 10 micrometers. Further, the first thickness 132 may be approximately 50-150% of the third thickness 136, and the second thickness 134 may be approximately 50-150% of the fourth thickness 138. It should be understood that the anode 104 may be scalable to larger or smaller sized batteries, and/or the above-described thicknesses 132, 134, 134, 138, 140a may differ. As an example, in general, a ratio of the third thickness 136 to the fifth thickness 140a (and/or of the fourth thickness 138 to the fifth thickness 140a) may be between 1:2 and 1:10.

Figure 9:
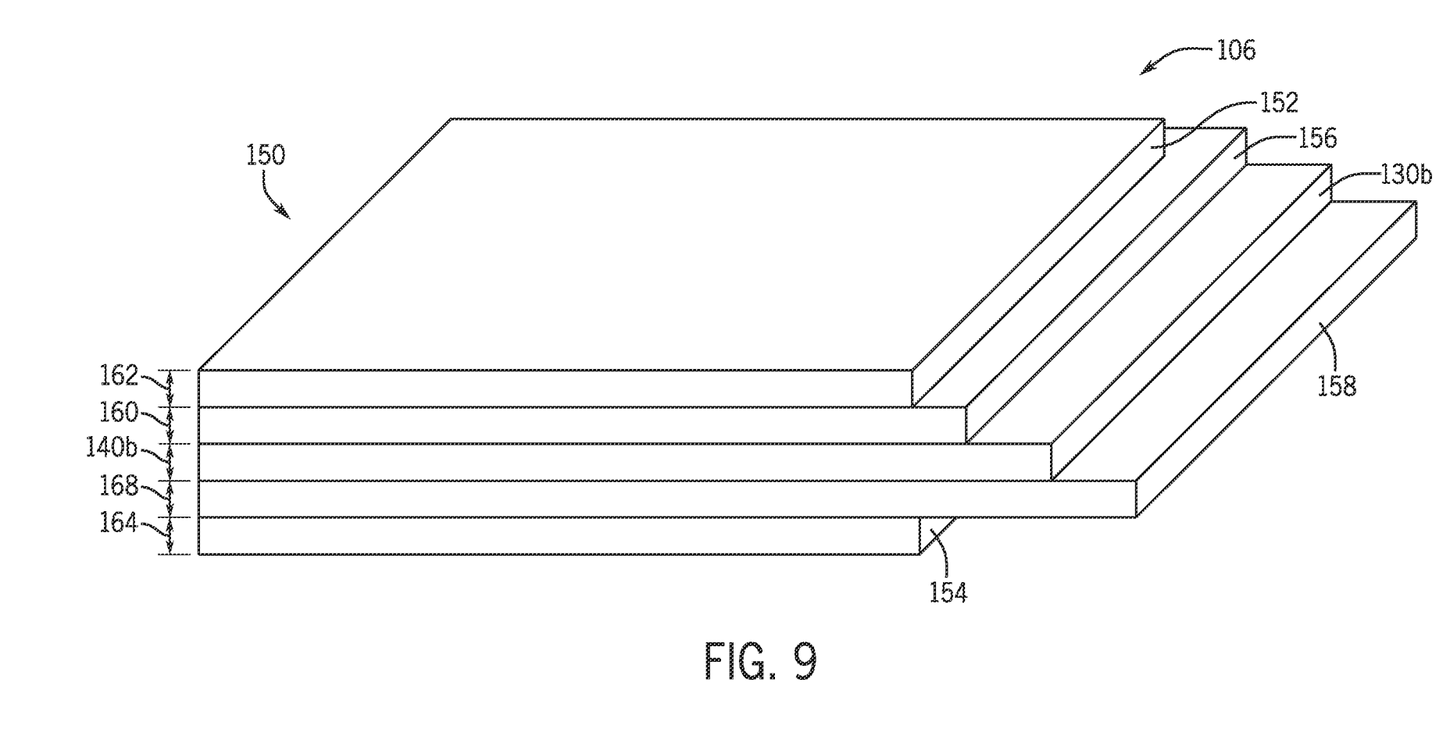
FIG. 9 is a schematic perspective view of a portion of a cathode of the battery of FIG. 7, the cathode including a thermoplastic polymer layer, in accordance with an embodiment of the present disclosure.

FIG. 9 is a schematic perspective view of an embodiment of a portion of the second electrode 106 of the battery 100 of FIG. 7. For purposes of clarity, the second electrode 106 will be referred to as the cathode 106 below. In the illustrated embodiment, the cathode 106 includes a layered structure 150 having a first coating 152 including lithium cobalt oxide (LCO), a second coating 154 including LCO, a first metal foil 156 including aluminum, a second metal foil 158 including aluminum, and a thermoplastic polymer layer 130b including PET, CPP, or both. The first metal foil 156, the second metal foil 158, and the thermoplastic polymer layer 130b, which may be collectively referred to as a laminated film, may be disposed between the first coating 152 and the second coating 154. Further, the thermoplastic polymer layer 130b may be disposed between the first metal foil 156 and the second metal foil 158. Use of the thermoplastic polymer layer 130b (e.g., including PET, CCP, or both) in the laminated film as described above may enable a proper tensile strength and elongation rate similar to those in traditional films (e.g., metal foils) that do not employ the thermoplastic polymer layer 130b.

The thermoplastic polymer layer 130b may be configured to reduce burring in the first metal foil 156 and the second metal foil 158 that may otherwise occur in response to mechanical abuse of the cathode 106. Further, the thermoplastic polymer layer 130b may include openings or voids therethrough that facilitate electrical conductive paths between the first metal foil 156 and the second metal foil 158. For example, in some embodiments, the first metal foil 156 and the second metal foil 158 may be sputtered or otherwise disposed on opposing sides of the thermoplastic polymer layer 130b such that the corresponding material (e.g., aluminum) fills the openings or voids in the thermoplastic polymer layer 130b between the first metal foil 156 and the second metal foil 158.

Sizing of the first and second coatings 152, 154, the first and second metal foils 156, 158, and the thermoplastic polymer layer 130b may be selected to enable normal operation of the cathode 106 (and corresponding battery) and improve burring and short circuit protection thereof. In the illustrated embodiment, the first coating 152 includes a first thickness 162, the second coating 154 includes a second thickness 164, the first metal foil 156 includes a third thickness 166, the second metal foil 158 includes a fourth thickness 168, and the thermoplastic polymer layer 130b includes a fifth thickness 140b. In one embodiment, the third thickness 166 may be within a range of 1 nanometer to 3 micrometers, the fourth thickness 168 may be within a range of 1 nanometer to 3 micrometers, and the fifth thickness 140b may be within a range of 2 micrometers to 10 micrometers. Further, the first thickness within 50-150% of the fourth thickness 138. It should be understood that the cathode 106 may be scalable to larger or smaller sized batteries, and/or the above-described thicknesses 162, 164, 164, 168, 140b may differ. As an example, in general, a ratio of the third thickness 166 to the fifth thickness 140b (and/or of the fourth thickness 168 to the fifth thickness 140b) may be between 1:2 and 1:10.

It should be understood that the thermoplastic polymer layer 130a of FIG. 8 and the thermoplastic polymer layer 130b of FIG. 9 may each include various thermoplastic polymer sublayers. For example, the thermoplastic polymer layers 130a, 130b may each include a first thermoplastic polymer sublayer having CPP, a second thermoplastic polymer sublayer having CPP, and a third thermoplastic polymer sublayer having PET and disposed between the first and second thermoplastic polymer sublayers. In some embodiments, the thermoplastic polymer layers 130a, 130b may each include three thermoplastic polymer sublayers having PET. In general, as previously described, the thermoplastic polymer layers 130a, 130b are configured to reduce a likelihood of burring (and corresponding short circuit) in the first metal foils 126, 156 of the anode 104 and the cathode 106, respectively, and/or the second metal foils 128, 158 of the anode 104 and the cathode 106, respectively.

Figure 10:
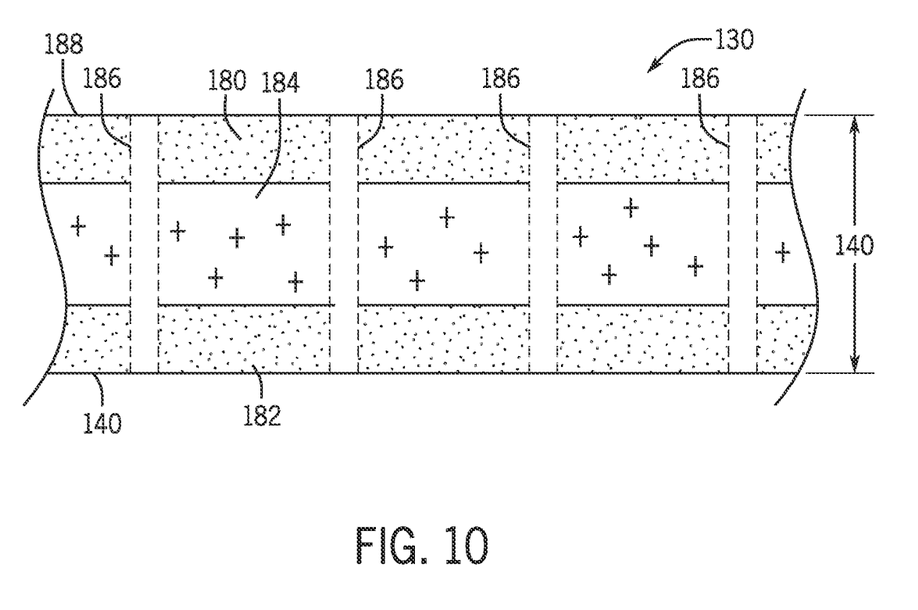
FIG. 10 is a schematic cross-sectional view of three thermoplastic polymer sublayers employed in the thermoplastic polymer layer of the anode of FIG. 8, the thermoplastic polymer layer of the cathode of FIG. 9, or both, in accordance with an embodiment of the present disclosure.

FIG. 10 is a schematic cross-sectional view of an embodiment of three thermoplastic polymer sublayers employed in the thermoplastic polymer layer 130a of the anode 104 of FIG. 8, the thermoplastic polymer layer 130b of the cathode 106 of FIG. 9, or both. In the illustrated embodiment, the thermoplastic polymer layer 130 includes a first thermoplastic polymer sublayer 180, a second thermoplastic polymer sublayer 182, and a third thermoplastic polymer sublayer 184 disposed between the first thermoplastic polymer sublayer 180 and the second thermoplastic polymer sublayer 182. The thickness 140 of the thermoplastic polymer layer 130 may correspond to the combined thicknesses of the first thermoplastic polymer sublayer 180, the second thermoplastic polymer sublayer 182, and the third thermoplastic polymer sublayer 184. In the illustrated embodiment, the first thermoplastic polymer sublayer 180 and the second thermoplastic polymer sublayer 182 may include CPP, whereas the third thermoplastic polymer sublayer 184 may include PET. In another embodiment, each of the first, second, and third thermoplastic polymer sublayers 180, 182, 184 may include PET.

As previously described, voids 186 may extend from a first side 188 of the thermoplastic polymer layer 130, through the thickness 140, and to the second side 190 of the thermoplastic polymer layer 130. That is, the voids 186 may extend through each of the first, second, and third thermoplastic polymer sublayers 180, 182, 184. The voids 186 may enable formation of electrical conductive paths between the metal foils (not shown) disposed adjacent to the opposing sides 188, 190 of the thermoplastic polymer layer 130. Accordingly, the voids 186 enable normal operation of the metal foils (and corresponding battery), while also providing improved protection against mechanical abuse, burring of the metal foils, and short circuit of the battery, as described in detail below with reference to FIG. 11.

Figure 11:
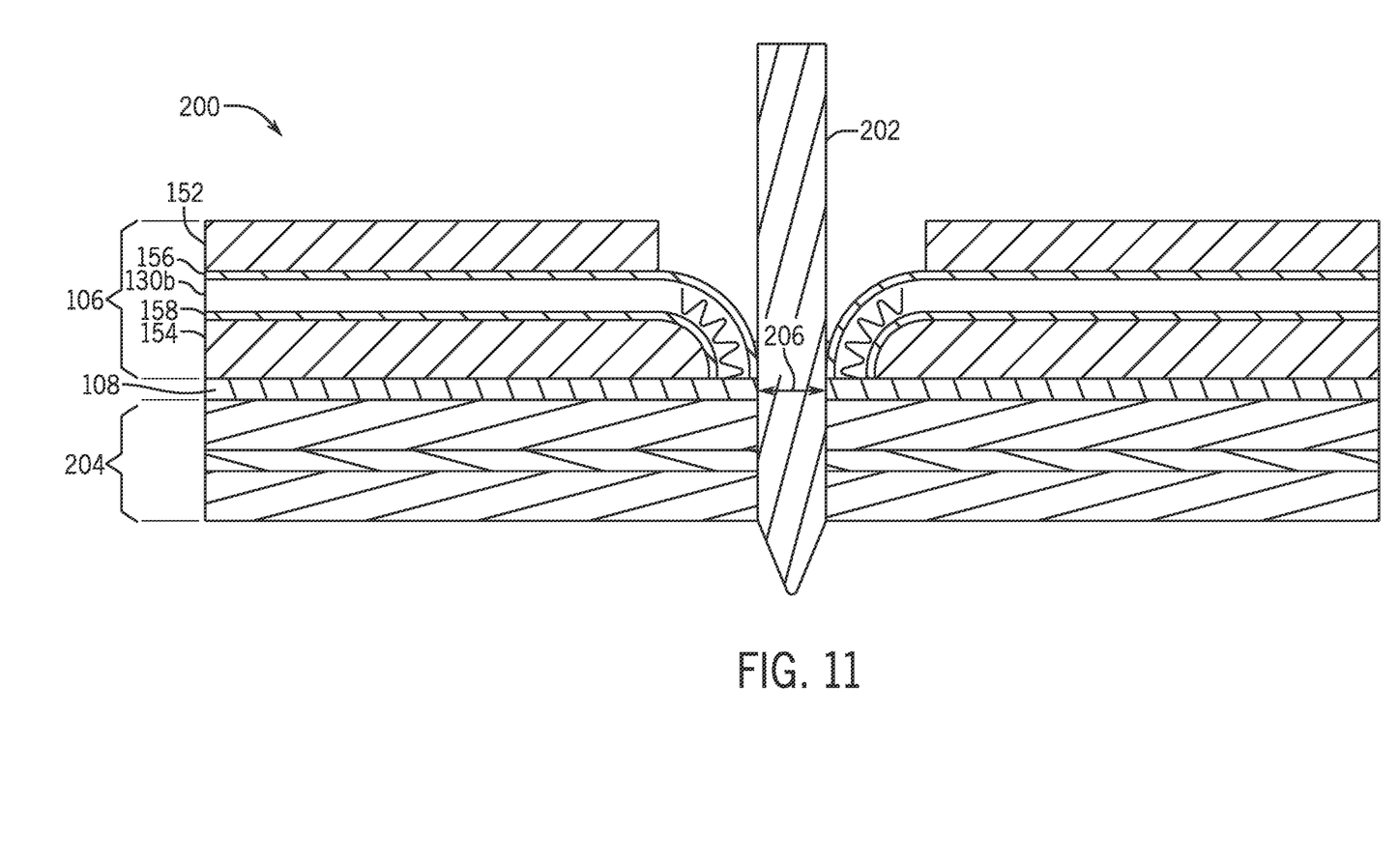
FIG. 11 is schematic cross-sectional view of an electrode assembly of the battery of FIG. 7 and a nail piercing the electrode assembly, in accordance with an embodiment of the present disclosure.

FIG. 11 is schematic cross-sectional view of an embodiment of an electrode assembly 200 of the battery 100 of FIG. 7. The electrode assembly 200 includes, for example, the cathode 106 (e.g., of FIG. 9), an anode 204, and the separator 108 between the cathode 106 and the anode 204. In the illustrated embodiment, the anode 204 does not include a thermoplastic polymer layer. However, it should be understood that the anode 204 in FIG. 11 may be replaced by the anode 104 of FIG. 8.

As previously described, the cathode 106 includes the first and second coatings 152, 154 (e.g., including LCO), the first and second metal foils 156, 158 (e.g., including aluminum) between the first and second coatings 152, 154, and the thermoplastic polymer layer 130b (e.g., including PET, CPP, or both) between the first and second metal foils 156, 158. In the illustrated embodiment, a nail 202 is shown piercing the electrode assembly 200. Accordingly, FIG. 11 illustrates one example of mechanical abuse experienced by the electrode assembly 200, although other examples of mechanical abuse are also contemplated by the present disclosure. As shown, the nail 202 may enter the electrode assembly 200 through the cathode 106, causing portions of the cathode 106 to break and/or bend downwardly toward the separator 108 and the anode 204. The presence of the thermoplastic polymer layer 130b may enable a cleaner break in the first and second metal foils 156, 158, which may reduce burring in the first and second metal foils 156, 158. Because burring in the first and second metal foils 156, 158 may be a short circuit risk, reduction in the burring of the first and second metal foils 156, 158 may reduce the short circuit risk associated with mechanical abuse of the electrode assembly 200.

Further, inclusion of the thermoplastic polymer layer 130b may reduce an amount of material required in the first and second metal foils 156, 158 (or "current collector"), relative to a traditional embodiment not having the thermoplastic polymer layer 130b and employing a single metal foil. For example, in the illustrated embodiment, the nail 202 pierces the electrode assembly 200 and generates an opening 206 through the separator 108. In traditional embodiments not having the thermoplastic polymer layer 130b disposed between the first and second metal foils 156, 158 of the present disclosure, a single metal foil having a relatively large cross-sectional thickness may be employed. The relatively large cross-sectional thickness of the single metal foil in traditional embodiments may cause the single metal foil to be relatively susceptible to passing through the illustrated opening 206 in the separator 108. In contrast, the first metal foil 156 and the second metal foil 158 of the cathode 106, having relatively small cross-sectional thicknesses, are less susceptible to passing through the opening 206 in the separator 108 and contacting various aspects of the anode 204, which would otherwise present a short circuit risk.

Further, as shown, the second metal foil 158 is blocked from the opening 206 through the separator 108 via at least the thermoplastic polymer layer 130b. Further still, even if a portion of the first metal foil 156 were to pass through the opening 206 in the separator 108 and contact aspects of the anode 204, said portion of the first metal foil 156 may be relatively small, and any contact (or electrical conductive path formed) between the portion of the first metal foil 156 and the anode 204 may be relatively thin. The relatively thin contact may cause a relatively high impedance, which may reduce a current flow between the cathode 106 and the anode 104, thereby negating (or reducing an impact) of any short circuit. As previously described, it should be understood that the anode 204 in FIG. 11 may be replaced, in another embodiment, with the anode 104 of FIG. 8.

Figure 12:
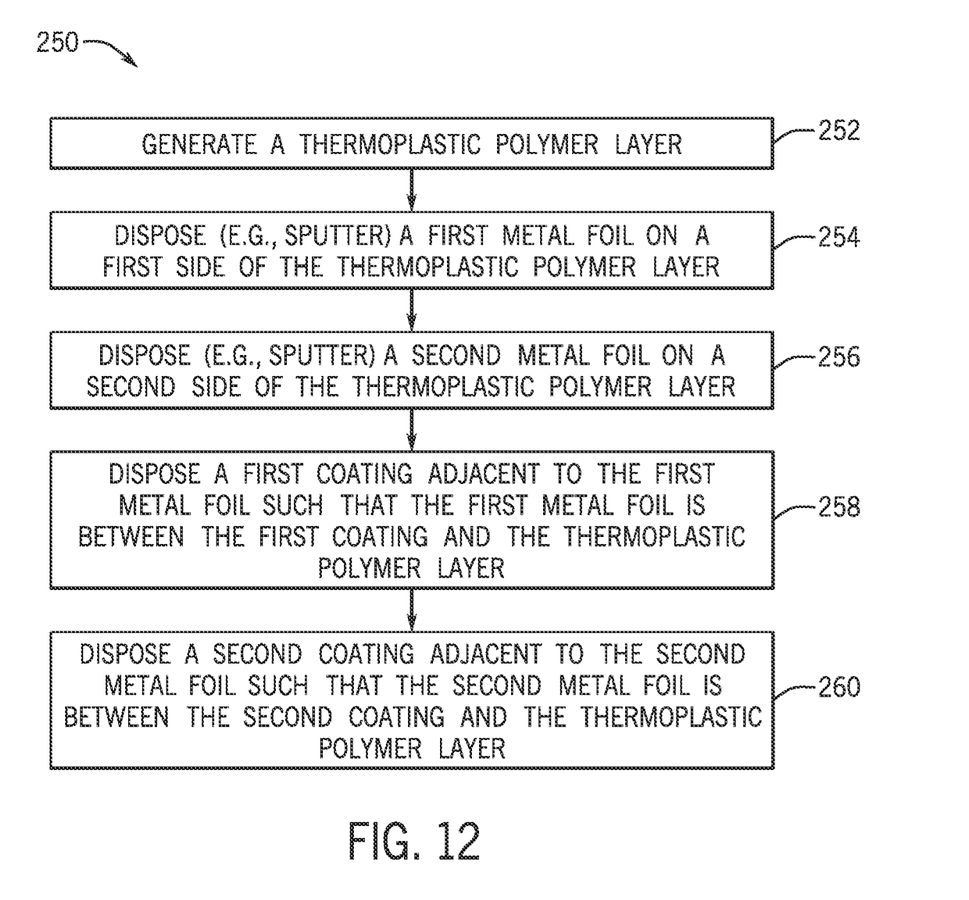
FIG. 12 is a process flow diagram illustrating a method of manufacturing the battery of FIG. 7, in accordance with an embodiment of the present disclosure.

FIG. 12 is a process flow diagram illustrating an embodiment of a method 250 of manufacturing the battery 100 of FIG. 7. In the illustrated embodiment, the method 250 includes generating (block 252) a thermoplastic polymer layer 30. As previously described, the thermoplastic polymer layer 30 may include a first thermoplastic polymer sublayer 180, a second thermoplastic polymer sublayer 182, and a third thermoplastic polymer sublayer 184 between the first thermoplastic polymer sublayer 180 and the second thermoplastic polymer sublayer 182. In one embodiment, the first thermoplastic polymer sublayer 180 includes CPP, the second thermoplastic polymer sublayer 182 includes CPP, and the third thermoplastic polymer sublayer 184 includes PET. In another embodiment, the first thermoplastic polymer sublayer 180, the second thermoplastic polymer sublayer 182, and the third thermoplastic polymer sublayer 184 each include PET. Further, as previously described, the thermoplastic polymer layer 30 (e.g., including the first, second, and third thermoplastic polymer sublayers 180, 182, 184) may include a matrix of openings or voids extending therethrough. Indeed, as described in detail below, the openings or voids may facilitate electrical conductive paths between metal foils (e.g., the first and second metal foils 126, 128 in the anode 104 of FIG. 8) on opposing sides of the thermoplastic polymer layer 30. Any suitable manufacturing process for generating the thermoplastic polymer layer 30 may be employed at block 252.

The method 250 also includes disposing (block 254) a first metal foil (e.g., the first metal foil 126 corresponding to the anode 104 of FIG. 8) on a first side of the thermoplastic polymer layer 30, and disposing (block 256) a second metal foil (e.g., the second metal foil 128 corresponding to of the anode 104 of FIG. 8) on a second side of the thermoplastic polymer layer 30. For purposes of clarity, the description below references the anode 104 of FIG. 8, but it should be understood that the same or similar steps may be completed with respect to the cathode 106 in FIG. 9. As previously described, the first metal foil 126 and the second metal foil 128 may be sputtered or otherwise disposed on opposing sides of the thermoplastic polymer layer 30. In some embodiments, a material of the first and second metal foils 126, 128, such as copper, may extend through and/or fill the openings or voids formed in the thermoplastic polymer layer 30. In this way, electrical conductive paths are formed between the first metal foil 126 and the second metal foil 128.

The method 250 also includes disposing (block 258) a first coating, such as the first coating 122 of the anode 104 of FIG. 8, adjacent to the first metal foil 126 such that the first metal foil 126 is between the first coating 122 and the thermoplastic polymer layer 30. Further, the method 250 includes disposing (block 260) a second coating, such as the second coating 124 of FIG. 8, adjacent to the second metal foil 128 such that the second metal foil 128 is between the second coating 124 and the thermoplastic polymer layer 30. It should be noted that the various steps 252, 254, 256, 258, 260 of the method 250 in FIG. 11 may be performed in the order described above, or in alternative orders. In general, the method 250 produces an electrode in accordance with the present disclosure, such as the anode 104 illustrated in FIG. 8 and including the first and second coatings 122, 124, the first and second metal foils 126, 128, and the thermoplastic polymer layer 130a (e.g., including the first thermoplastic polymer sublayer 180, the second thermoplastic polymer sublayer 182, and the third thermoplastic polymer sublayer 184 illustrated in FIG. 10).

In general, embodiments of the present disclosure are directed toward a thermoplastic polymer layer (e.g., including various thermoplastic polymer sublayers) employed in an electrode of a battery. The thermoplastic polymer layer may be configured to reduce, relative to traditional embodiments, a likelihood of short circuits caused by mechanical abuse of the battery. For example, the thermoplastic polymer layer may be configured to reduce burring (e.g., in first and second metal foils disposed on opposing sides of the thermoplastic polymer layer) that may otherwise be caused by mechanical abuse of the battery.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ," it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A battery electrode, comprising:
a first metal foil;
a second metal foil;
a thermoplastic polymer layer between the first metal foil and the second metal foil, wherein the thermoplastic layer comprises a first cast polypropylene sublayer, a second cast polypropylene sublayer, and a polyethylene terephthalate sublayer between the first cast polypropylene sublayer and the second cast polypropylene sublayer;
a plurality of voids extending through the thermoplastic polymer layer and configured to facilitate a corresponding plurality of electrical conductive paths between the first metal foil and the second metal foil;
a first coating adjacent to the first metal foil such that the first metal foil is between the thermoplastic polymer layer and the first coating; and
a second coating adjacent to the second metal foil such that the second metal foil is between the thermoplastic polymer layer and the second coating.

2. The battery electrode of claim 1, wherein the thermoplastic polymer layer comprises polyethylene terephthalate, cast polypropylene, or both.

3. The battery electrode of claim 1, comprising a metal extending through the plurality of voids and establishing the plurality of electrical conductive paths between the first metal foil with the second metal foil.

4. The battery electrode of claim 1, wherein the first metal foil comprises a first copper foil and the second metal foil comprises a second copper foil.

5. The battery electrode of claim 1, wherein the first metal foil comprises a first aluminum foil and the second metal foil comprises a second aluminum foil.

6. The battery electrode of claim 1, wherein the first coating comprises a first graphite coating and the second coating comprises a second graphite coating.

7. The battery electrode of claim 1, wherein the first coating comprises a first lithium cobalt oxide coating and the second coating comprises a second lithium cobalt oxide coating.

8. The battery electrode of claim 1, wherein:
the first metal foil comprises a first thickness within a first range of 1 nanometer to 3 micrometers;
the second metal foil comprises a second thickness within a second range of 1 nanometer to 3 micrometers; and
the thermoplastic polymer layer comprises a third thickness within a third range of 2 micrometers to 10 micrometers.

9. A layered structure for a battery electrode, the layered structure comprising:
a first metal foil comprising a first material composition;
a second metal foil comprising a second material composition substantially the same as the first material composition; and
a thermoplastic polymer layer between the first metal foil and the second metal foil, wherein the thermoplastic polymer layer comprises a first sublayer comprising cast polypropylene, a second sublayer comprising cast polypropylene, and a third sublayer comprising polyethylene terephthalate, and wherein the third sublayer is between the first sublayer and the second sublayer.

10. The layered structure of claim 9, wherein the first material composition and the second material composition comprise copper.

11. The layered structure of claim 9, comprising a plurality of voids extending through the thermoplastic polymer layer and a metal extending through the plurality of voids between the first metal foil and the second metal foil such that the metal establishes a plurality of electrical conductive paths between the first metal foil and the second metal foil.

12. The layered structure of claim 9, comprising:
a first coating; and
a second coating, wherein the first metal foil, the second metal foil, and the thermoplastic polymer layer is between the first coating and the second coating.

13. The layered structure of claim 12, wherein the first material composition and the second material composition comprise aluminum.

14. The layered structure of claim 9, wherein:
the first metal foil comprises a first thickness within a first range of 1 nanometer to 3 micrometers;
the second metal foil comprises a second thickness within a second range of 1 nanometer to 3 micrometers; and
the thermoplastic polymer layer comprises a third thickness within a third range of 2 micrometers to 10 micrometers.

15. A secondary battery, comprising:
an anode comprising a first thermoplastic polymer layer between a first copper foil and a second copper foil, a first graphite coating adjacent to the first copper foil such that the first copper foil is between the first graphite coating and the first thermoplastic polymer layer, and a second graphite coating adjacent to the second copper foil such that the second copper foil is between the second graphite coating and the first thermoplastic polymer layer, wherein the first thermoplastic polymer layer comprises a first cast polypropylene sublayer, a second cast polypropylene sublayer, and a polyethylene terephthalate sublayer between the first cast polypropylene sublayer and the second cast polypropylene sublayer; and a cathode comprising a second thermoplastic polymer layer between a first aluminum foil and a second aluminum foil, a first lithium cobalt oxide coating adjacent to the first aluminum foil such that the first aluminum foil is between the first lithium cobalt oxide coating and the second thermoplastic polymer layer, and a second lithium cobalt oxide coating adjacent to the second aluminum foil such that the second aluminum foil is between the second lithium cobalt oxide coating and the second thermoplastic polymer layer.

16. The secondary battery of claim 15, wherein the first thermoplastic polymer layer comprises polyethylene terephthalate, cast polypropylene, or both.

17. The secondary battery of claim 15, comprising a plurality of voids extending through the first thermoplastic polymer layer and a copper extending through the plurality of voids between the first copper foil and the second copper foil such that the copper establishes a plurality of electrical conductive paths between the first copper foil and the second copper foil.

18. The secondary battery of claim 15, wherein:
the first copper foil comprises a first thickness within a first range of 1 nanometer to 3 micrometers;
the second copper foil comprises a second thickness within a second range of 1 nanometer to 3 micrometers; and
the first thermoplastic polymer layer comprises a third thickness within a third range of 2 micrometers to 10 micrometers.

19. The secondary battery of claim 15, comprising a separator between the anode and the cathode.

\* \* \* \* \*